United States Patent
Choi et al.

(10) Patent No.: US 8,443,018 B2
(45) Date of Patent: May 14, 2013

(54) MOBILE TERMINAL AND UNIT CONVERTING METHOD THEREOF

(75) Inventors: Hye-Jin Choi, Seoul (KR); Seong-Yoon Cho, Seoul (KR); Min-Soo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 1006 days.

(21) Appl. No.: 12/464,984

(22) Filed: May 13, 2009

(65) Prior Publication Data
US 2010/0169397 A1   Jul. 1, 2010

(30) Foreign Application Priority Data
Dec. 29, 2008   (KR) .................. 10-2008-0136079

(51) Int. Cl.
*G06F 7/00* (2006.01)
*G06F 15/00* (2006.01)

(52) U.S. Cl.
USPC ......................... 708/201; 708/205; 708/206

(58) Field of Classification Search ............... None
See application file for complete search history.

(56) References Cited

U.S. PATENT DOCUMENTS

2005/0272468 A1* 12/2005 Tsai et al. ............. 455/556.1
2009/0106155 A1* 4/2009 Castellanos et al. .......... 705/51

* cited by examiner

*Primary Examiner* — Scott Sun
(74) *Attorney, Agent, or Firm* — KED & Associates, LLP

(57) ABSTRACT

A mobile terminal and its unit conversion method are disclosed. When a unit conversion function is selected through a menu manipulation by a user, the selected unit conversion function is executed, and then, when a unit conversion factor for a unit conversion is selected, a reference unit related to the selected unit conversion factor is converted into two or more different units and the converted information is displayed in the form of a unit scale. The unit conversion factor includes volume, area, distance, speed, currency, mass, weight, dimension, and the like.

13 Claims, 13 Drawing Sheets

FIG. 10
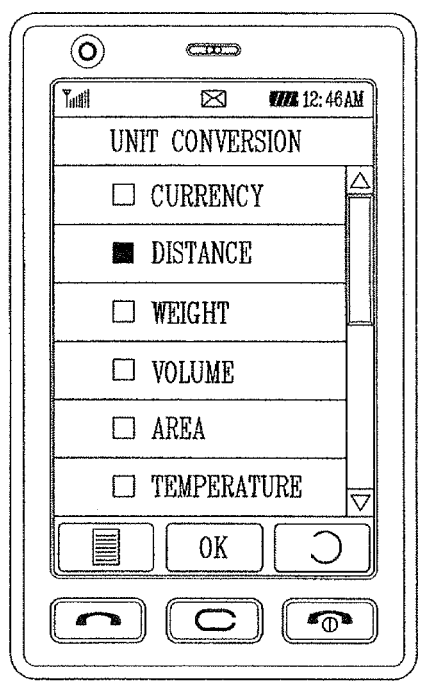
(a)
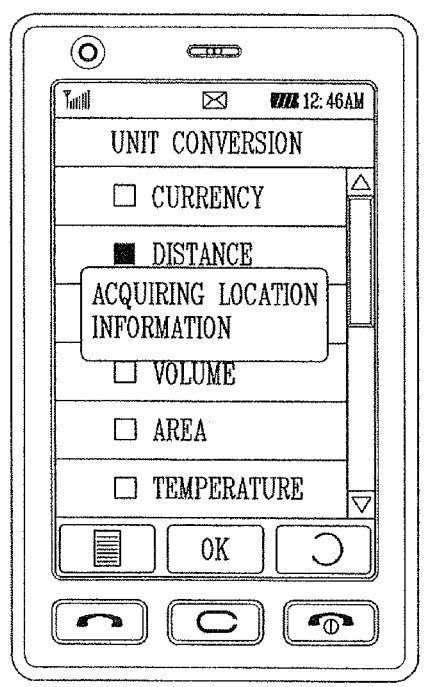
(b)
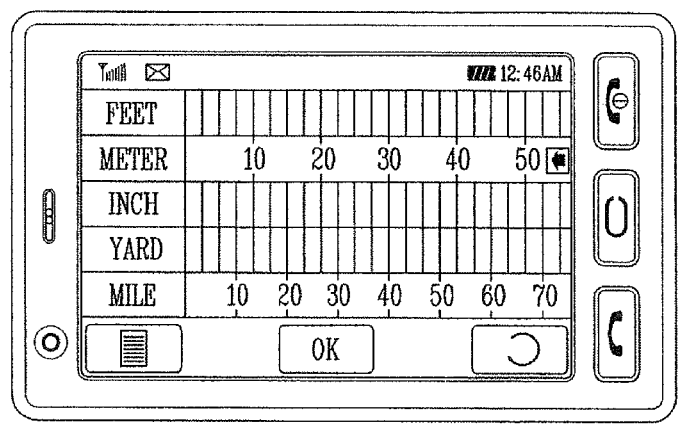
(c)

FIG. 12
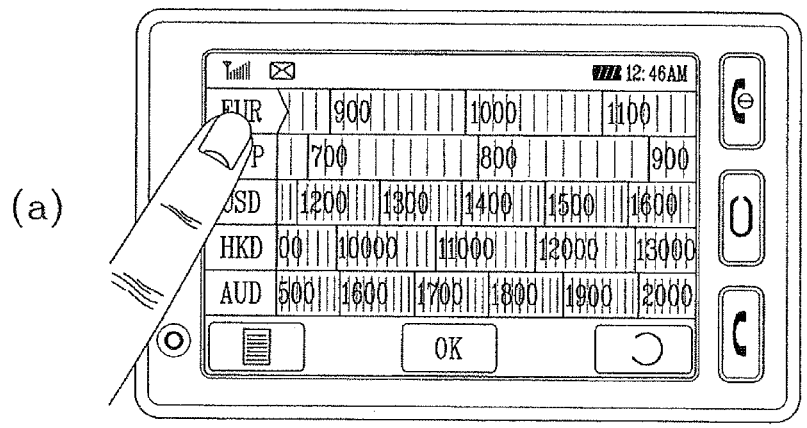
(a)
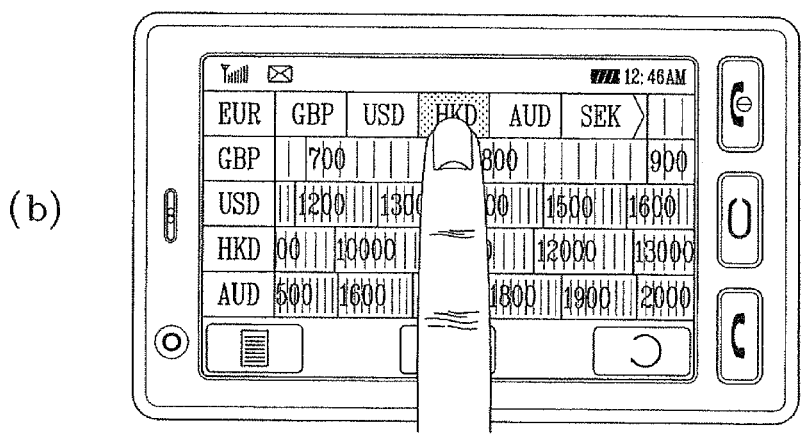
(b)
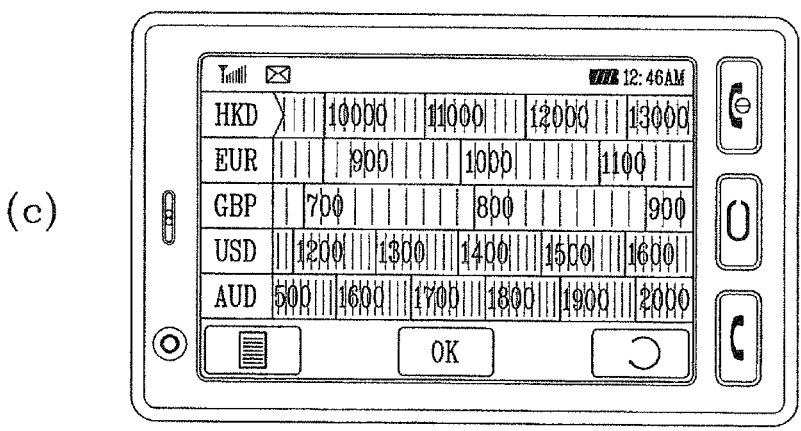
(c)

FIG. 13
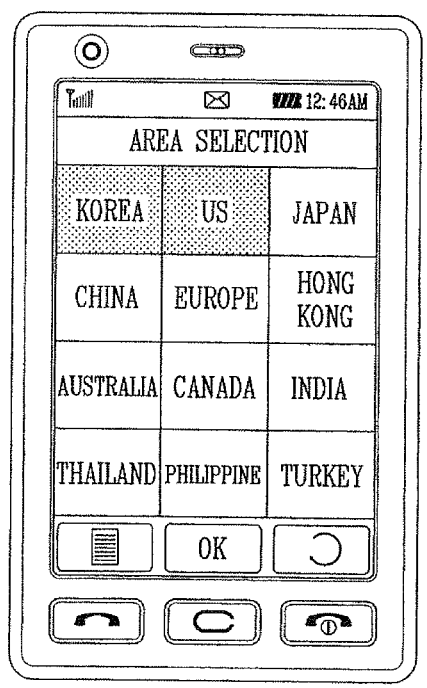
(a)
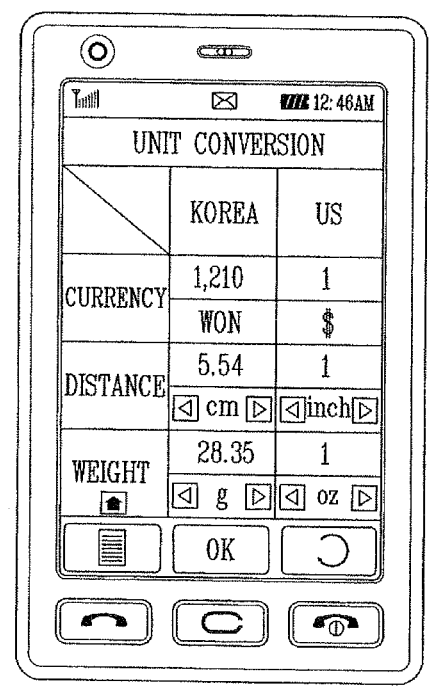
(b)

MOBILE TERMINAL AND UNIT CONVERTING METHOD THEREOF

CROSS REFERENCE TO A RELATED APPLICATION

The present application claims priority to Korean Application No. 10-2008-0136079 filed in Korea on Dec. 29, 2008, the entire contents of which is hereby incorporated by reference in its entirety.

FIELD OF THE INVENTION

The present invention relates to a mobile terminal providing unit conversion information obtained by converting a particular value into two or more units, and its unit conversion method.

DESCRIPTION OF THE RELATED ART

A mobile terminal such as a personal computer, a notebook computer, a mobile phone, and the like, may be configured to perform diverse functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

In general, the terminals may be divided into a mobile terminal and stationary terminal according to whether or not terminals are movable. In addition, mobile terminals may be divided into a handheld terminal and a vehicle mount terminal according to whether or not users can directly carry it around.

Efforts are ongoing to support and increase the functionality of mobile terminals. Such efforts include software and hardware improvements, as well as changes and improvements in the structural components which form the mobile terminal.

In general, in the mobile terminal, when a value to be converted is inputted and a conversion unit is selected, the inputted value is converted into the selected unit.

SUMMARY OF THE INVENTION

Accordingly, one object of the present invention is to address the above-noted and other problems.

Another object of the present invention is to provide a mobile terminal that provides information obtained by converting a single unit into a plurality of units, and its unit conversion method.

To achieve these and other advantages and in accordance with the purpose of the present invention, as embodied and broadly described herein, the present invention provides in one aspect a mobile terminal including: a user input unit that receives a unit conversion factor to be unit-converted; a controller that converts a reference unit related to the unit conversion factor received via the user input unit into two or more units; and a display unit that displays the converted unit calculation information.

To achieve these and other advantages and in accordance with the purpose of the present invention, as embodied and broadly described herein, the present invention provides in another aspect a unit conversion method of a mobile terminal, including: displaying a unit conversion factor list when a unit conversion function is executed; when one on the displayed unit conversion factor list is selected, converting a reference unit related to the selected unit conversion factor into two or more units; and displaying the converted unit conversion information.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 10 is an overview of display screens illustrating unit conversion in the mobile terminal related to the embodiment of FIG. 9;

FIG. 12 is an overview of display screens illustrating changing of reference units in the mobile terminal according to an embodiment of the present invention; and FIG. 13 is an overview of display screens illustrating a unit changing method of the mobile terminal according to an embodiment of the present invention.

DETAILED DESCRIPTION OF THE PREFERRED EMBODIMENTS

The mobile terminal according to exemplary embodiments of the present invention will now be described with reference to the accompanying drawings.

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

Mobile terminals may be implemented in various forms. For example, the terminal described in the present invention may include mobile terminals such as mobile phones, smart phones, notebook computers, digital broadcast receivers, PDAs (Personal Digital Assistants), PMPs (Portable Multimedia Player), navigation devices, and the like, and fixed terminals such as digital TVs, desk top computers and the like. Hereinafter, it is assumed that the terminal is a mobile terminal. However, it would be understood by a person in the art that the configuration according to the embodiments of the present invention can be also applicable to the fixed types of terminals, except for any elements especially configured for a mobile purpose.

Figure 1:
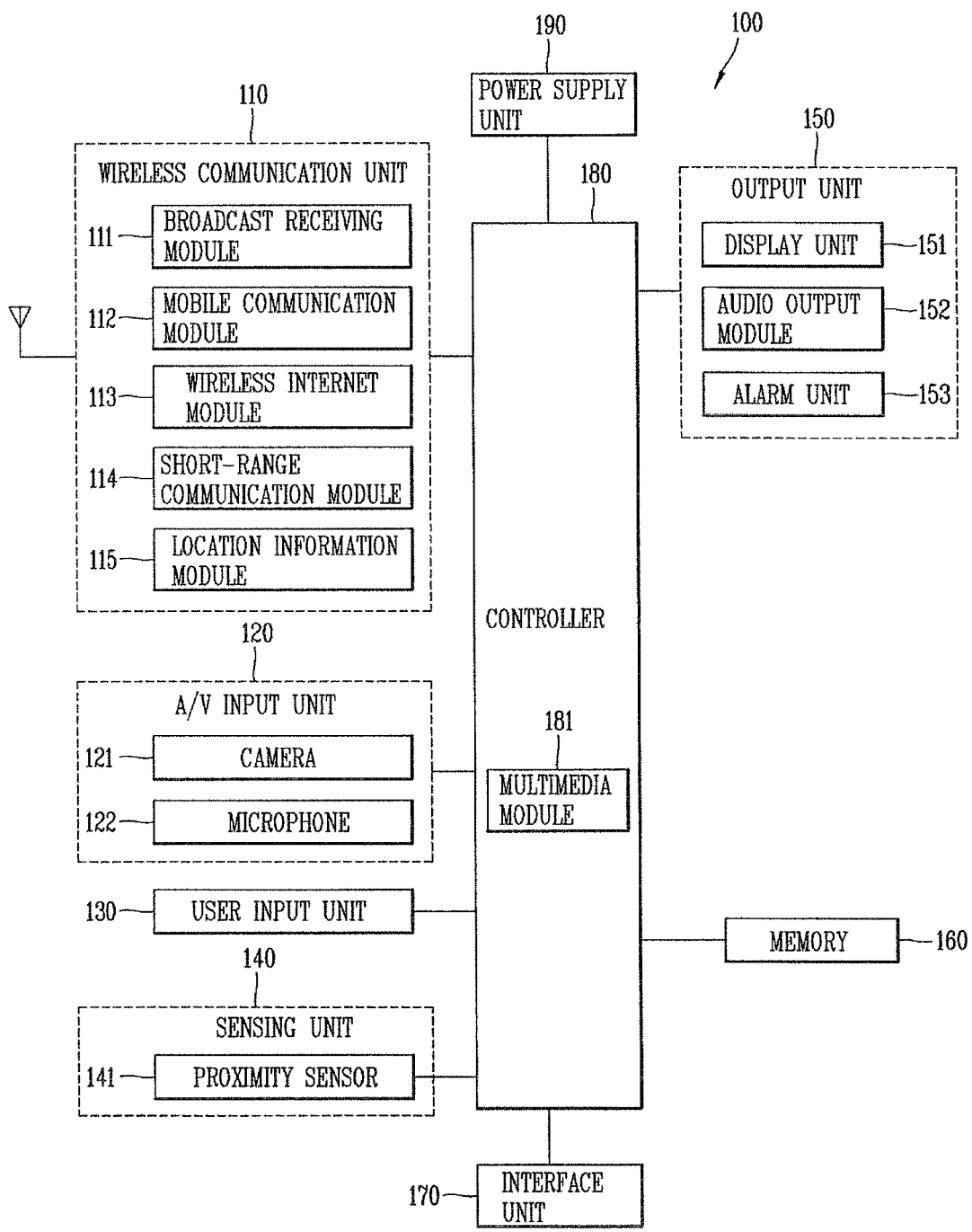
FIG. 1 is a schematic block diagram of a mobile terminal implementing an embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or another type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System). According to the current technology, the GPS module 115 calculates distance information from three or more satellites and accurate time information and applies trigonometry to the calculated information to thereby accurately calculate three-dimensional current location information according to latitude, longitude, and altitude. Currently, a method for calculating location and time information by using three satellites and correcting an error of the calculated location and time information by using another one satellite. In addition, the GPS module 115 can calculate speed information by continuously calculating the current location in real time.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

The identification module may be a memory chip (or other element with memory or storage capabilities) that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile terminal 100 or may be used to transfer data between the mobile terminal and an external device.

In addition, when the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal therethrough. Various command signals or power inputted from the cradle may be operated as a signal for recognizing that the mobile terminal is accurately mounted on the cradle.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent to allow viewing of the exterior, which may be called transparent displays. A typical transparent display may be, for example, a TOLED (Transparent Organic Light Emitting Diode) display, or the like. The mobile terminal 100 may include two or more display units (or other display means) according to its particular desired embodiment. For example, the mobile terminal may include both an external display unit (not shown) and an internal display unit (not shown). The touch screen may be configured to detect even a touch input pressure as well as a touch input position and a touch input area.

A proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like.

The operational principle of the RF oscillation type proximity sensor, among the implementable proximity sensors, will be described as an example. When an object approaches the sensor detection surface in a state that an RF (Radio Frequency) of a static wave is oscillated by an oscillation circuits the oscillation amplitude of the oscillation circuit is attenuated or stopped, and such a change is converted into an electrical signal to detect the presence or absence of an object. Thus, even if any material other than metallic one is positioned between the RF oscillation proximity sensor and the object, a proximity switch can detect the object intended to be detected without an interference by the object.

Without the proximity sensor 141, if the touch screen is an electrostatic type, the approach of a pointer (stylus) can be detected based on a change in a field according to the approach of the pointer.

Thus, although the pointer is not actually brought into contact with the touch screen but merely positioned close to the touch screen, the position of the pointer and the distance between the pointer and the touch screen can be detected. In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152.

The memory 160 (or other storage means) may store software programs or the like used for the processing and controlling operations performed by the controller 180, or may temporarily store data (e.g., a phonebook, messages, still images, video, etc.) that have been outputted or which are to be outputted.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage device that performs the storage function of the memory 160 over a network connection.

The controller 180 (such as a microprocessor or the like) typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180.

The controller 180 may perform a pattern recognition processing to recognize a handwriting input or a picture drawing input performed on the touch screen as characters or images.

The power supply unit 190 receives external power (via a power cable connection) or internal power (via a battery of the mobile terminal) and supplies appropriate power required for operating respective elements and components under the control of the controller 180.

Various embodiments as described herein may be implemented in a computer-readable medium using, for example, computer software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180.

For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

So far, the mobile terminal has been described from the perspective of its functions. Hereinafter, external elements of the mobile terminal will be described from the perspective of their functions with reference to FIGS. 2 and 3.

The mobile terminal may be implemented in a variety of different configurations. Examples of such configurations include folder-type, bar-type, swing-type, a slide type, as well as various other configurations. The following description will primarily relate to a slide-type mobile terminal. However, such description can equally apply to other types of mobile terminals.

Figure 2:
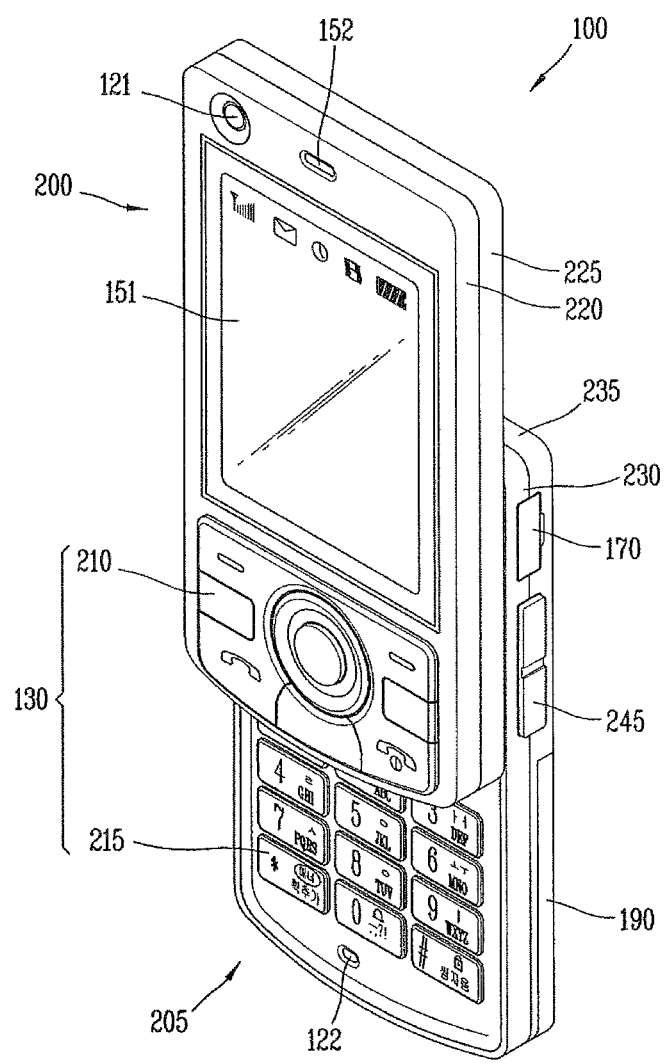
FIG. 2 is a front perspective view of a mobile terminal implementing an embodiment of the present invention.

FIG. 2 is a front perspective view of the mobile terminal according to an embodiment of the present invention.

The mobile terminal 100 according to the present invention includes a first body 200, and a second body 205 that can be slidably moved along at least one direction with respect to the first body 200. In case of a folder type mobile phone, the mobile terminal 100 may include a first body and a second body having one side that can be folded or unfolded with respect to the first body.

A state in which the first body is disposed to overlap with the second body 205 may be called a closed configuration, and as shown in FIG. 2, a state in which at least a portion of the second body 205 is exposed may be called an open configuration.

Although not shown, the mobile terminal according to the present invention may be the folder type mobile terminal including the first body and the second body having one side to be folded or unfolded with respect to the first body. Here, a state in which the second body is folded may be called a closed configuration, and a state in which the second body is unfolded may be called an open configuration.

In addition, although not shown, the mobile terminal according to the present invention may be a swing type mobile terminal including a first body and a second body configured to be swingable with respect to the first body. Here, a state in which the first body is disposed to overlap with the second body may be called a closed configuration, and a state in which the second body is swung to expose a portion of the first body may be called an open configuration.

The folder type mobile terminal and the swing type mobile terminal can be easily know by the person in the art without any explanation, so its detailed description will be omitted.

In the closed configuration, the mobile terminal mainly operates in a standby (or idle) mode, and the standby mode may be released upon user manipulation. The mobile terminal operates mainly in the calling mode or the like in the open configuration, and it can be changed to the standby mode with the lapse of time or upon user manipulation.

The case (or casing, housing, cover, etc.) constituting the external appearance of the first body 200 may include a first front case 220 and a first rear case 225. Various electronic components are installed in the space between the first front case 220 and the first rear case 225. One or more intermediate cases may be additionally disposed between the first front case 220 and the first rear case 225.

The cases may be formed by injection-molding a synthetic resin or may be made of a metallic material such as stainless steel (STS) or titanium (Ti), etc.

The display unit 151, the audio output module 152, the camera 121 or the first user input unit 210 may be located at the first body 200, specifically, on the first front case 220 of the first body 200.

The display unit 151 has been described in relation to FIG. 1, so its detailed description will be omitted for the sake of brevity.

The audio output unit 152 may be implemented in the form of a speaker or other sound producing device.

The camera 121 may be implemented to be suitable for capturing images or video with respect to the user and other objects.

Like the first body 200, the case constituting the external appearance of the second body 205 may include a second front case 230 and a second rear case 235.

A second user input unit 215 may be disposed at the second body, specifically, at a front face of the second body 205.

A third user input unit 245, the microphone 122, the interface unit 170 may be disposed on at least one of the second front case 230 and the second rear case 235.

The first to third user input units 210, 215 and 245 may be generally referred to as a manipulating portion 130, and various methods and techniques can be employed for the manipulation unit so long as they can be operated by the user in a tactile manner.

For example, the user input units 130 can be implemented as dome switches, actuators, or touch pad regions that can receive user commands or information according to the user's touch operations (e.g., pressing, pushing, swiping, drag-and-drop, etc.) or may be implemented in the form of a rotatable control wheel (or disc), keys or buttons, a jog dial, a joystick, or the like.

In terms of their functions, the first user input unit 210 is used for inputting (entering) commands such as start, end, scroll or the like, and the second user input unit 215 is used for inputting (entering) numbers, characters, symbols, or the like. The first user input unit 210 may include a soft key used by interworking with icons displayed on the display unit 151 and navigation key (largely including four direction keys and a central key) for indicating and checking directions.

Also, the third user input unit 245 may support the so-called hot key functions that allow more convenient activation of particular functions for the mobile terminal.

The microphone 122 (or other sound pick-up device) may be appropriately implemented to detect user voice inputs, other sounds, and the like.

The interface unit 170 may be used as a communication link (or passage, path, etc.) through which the terminal can exchange data or the like with an external device. The interface unit 170 has been described in relation to FIG. 1, so its detailed description will be omitted.

The power supply unit 190 for supplying power to the terminal may be located at the second rear case 235.

The power supply unit 190 may be, for example, a rechargeable battery that can be detached.

Figure 3:
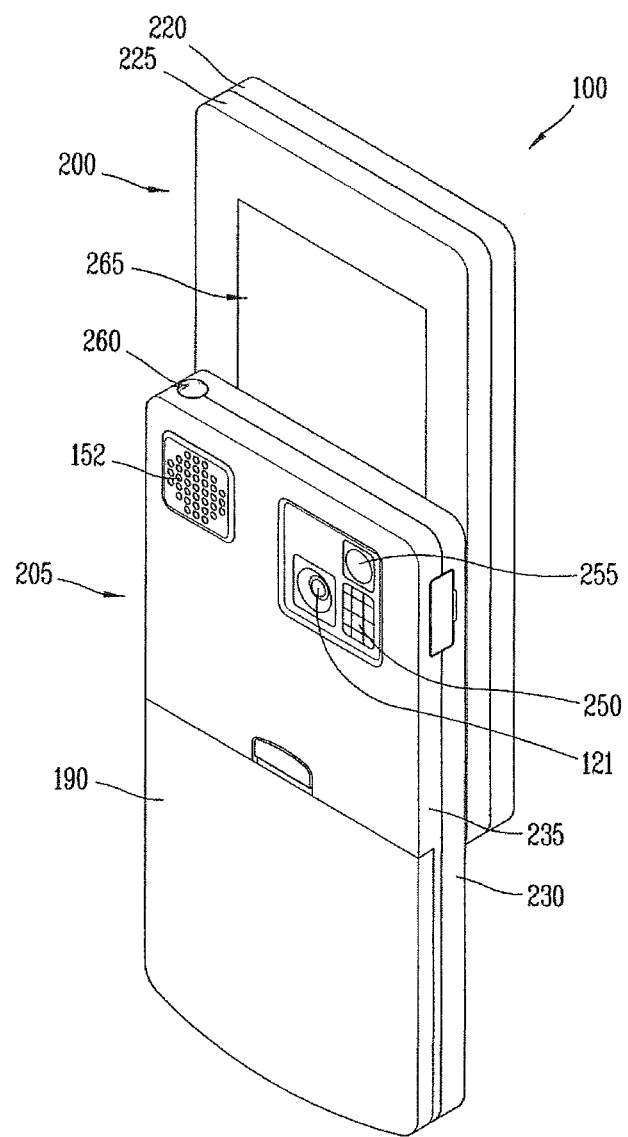
FIG. 3 is a rear perspective view of a mobile terminal implementing an embodiment of the present invention.

FIG. 3 is a rear perspective view of the mobile terminal of FIG. 2 according to an exemplary embodiment.

As shown in FIG. 3, a camera 121 (or other image pick-up device) may additionally be disposed on a rear surface of the second rear case 235 of the second body 205. The camera 121 of the second body 205 may have an image capture direction which is substantially opposite to that of the camera 121 of the first body 200 (namely, the two cameras may be implemented to face towards opposing directions, such as front and rear), and may support a different number of pixels (i.e., have a different resolution) than the camera 121 of the first body.

For example, the camera of the first body 200 may operate with a relatively lower resolution to capture an image(s) of the user's face and immediately transmit such image(s) to another party in real-time during video call communication or the like in which reverse link bandwidth capabilities may be limited. Also, the camera of the second body 205 may operate with a relatively higher resolution to capture images of general objects with high picture quality, which may not require immediately transmission in real-time, but may be stored for later viewing or use.

Additional camera related components, such as a flash 250 and a mirror 255, may be additionally disposed adjacent to the camera 121. When an image of the subject is captured with the camera 121 of the second body 205, the flash 250 illuminates the subject. The mirror 255 allows the user to see himself when he wants to capture his own image (i.e., self-image capturing) by using the camera 121 of the second body 205.

The second rear case 235 may further include an audio output module 152. The audio output module 152 of the second body 205 may support stereophonic sound functions in conjunction with the audio output module 152 of the first body 200 and may be also used for sending and receiving calls in a speaker phone mode.

A broadcast signal receiving antenna 260 may be disposed (externally or internally) at one side or region of the second rear case 235, in addition to an antenna that is used for mobile communications. The antenna 260 can also be configured to be retractable from the second body 205.

One part of a slide module 265 that allows the first body 200 and the second body 205 to slide relative to each other may be disposed on the first rear case 225 of the first body 200.

The other part of the slide module 265 may be disposed on the second front case 230 of the second body 205, which may not be exposed as shown in the drawing, The second camera 121 and other components may be disposed on the second body 205, but such configuration is not meant to be limited.

For example, one or more of the elements (e.g., 260, 121 and 250 and 152 etc.), which are disposed on the second rear case 235 may be mounted on the first body 200, mainly, on the first rear case 225. In this case, those elements disposed on the first rear case 225 can be protected (or covered) by the second body 205 in the closed configuration. In addition, even if a separate camera is not provided at the second body, the camera module 121 may be configured to rotate (or otherwise be moved) to thus allow image capturing in various directions.

The mobile terminal 100 as shown in FIGS. 1 to 3 may be configured to operate with a communication system, which transmits data via frames or packets, such as wired and wireless communication systems, as well as satellite-based communication systems.

Such communication systems in which the mobile terminal according to the present invention can operate will now be described with reference to FIG. 4.

Such communication systems may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), global system for mobile communications (GSM), and the like. As a non-limiting example, the description hereafter relates to a CDMA communication system, but such teachings apply equally to other types of systems.

Figure 4:
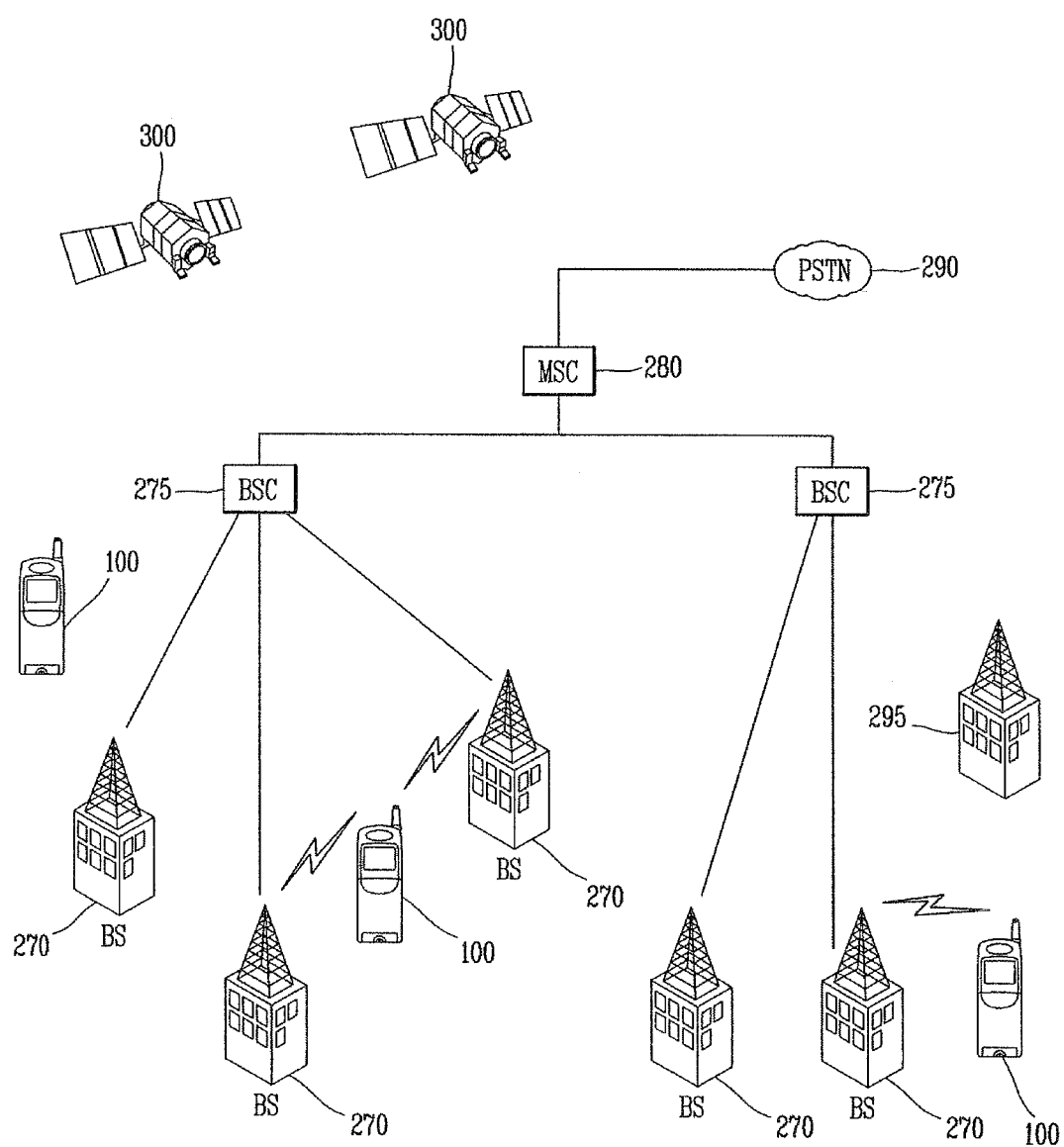
FIG. 4 is a block diagram of a wireless communication system with which the mobile terminal according to an embodiment of the present invention is operable.

Referring to FIG. 4, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 4 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs) or other equivalent terms. In such case, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 4, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295.

In FIG. 4, several global positioning systems (GPS) satellites 300 are shown. The satellites 300 help locate at least one of a plurality of terminals 100.

In FIG. 4, two satellites 300 are depicted, but it is understood that useful positioning information may be obtained with any number of satellites. The GPS module 115 as shown in FIG. 1 is typically configured to cooperate with the satellites 300 to obtain desired positioning information.

Instead of or in addition to GPS tracking techniques, other technologies that may track the location of the mobile terminals may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engaging in calls, messaging, and other types of communications. Each reverse-link signal received by a particular base station 270 is processed within the particular BS 270.

The resulting data is forwarded to an associated BSC 275. The BSC provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

A method for providing a unit conversion by the mobile terminal according to the present invention will now be described.

The mobile terminal 100 according to an embodiment of the present invention may acquire information can obtain information such as a current location of the terminal, a currency unit of each country, the exchange rate, and the like, via the wireless communication unit 110. For example, the controller 180 of the mobile terminal 100 can obtain such information from the base station via the mobile communication module 112. Or, the controller 180 may acquire information about the current location of the terminal from satellites via the location information module 115.

The controller 180 stores the information acquired via the wireless communication unit 110 in the memory 160. The memory 160 stores a look-up table including a conversion ratio used for unit conversion.

The controller 180 executes a unit conversion function according to a user input. The controller 180 determines a reference unit based on the information acquired via the wireless communication unit 110.

In addition, the controller 180 performs unit conversion with reference to the look-up table stored in the memory 160. In this case, the controller 180 converts a particular value into two or more units and outputs the unit conversion information to the display unit 151. The unit conversion information includes a unit type, a unit scale, a conversion value, and the like.

Figure 5:
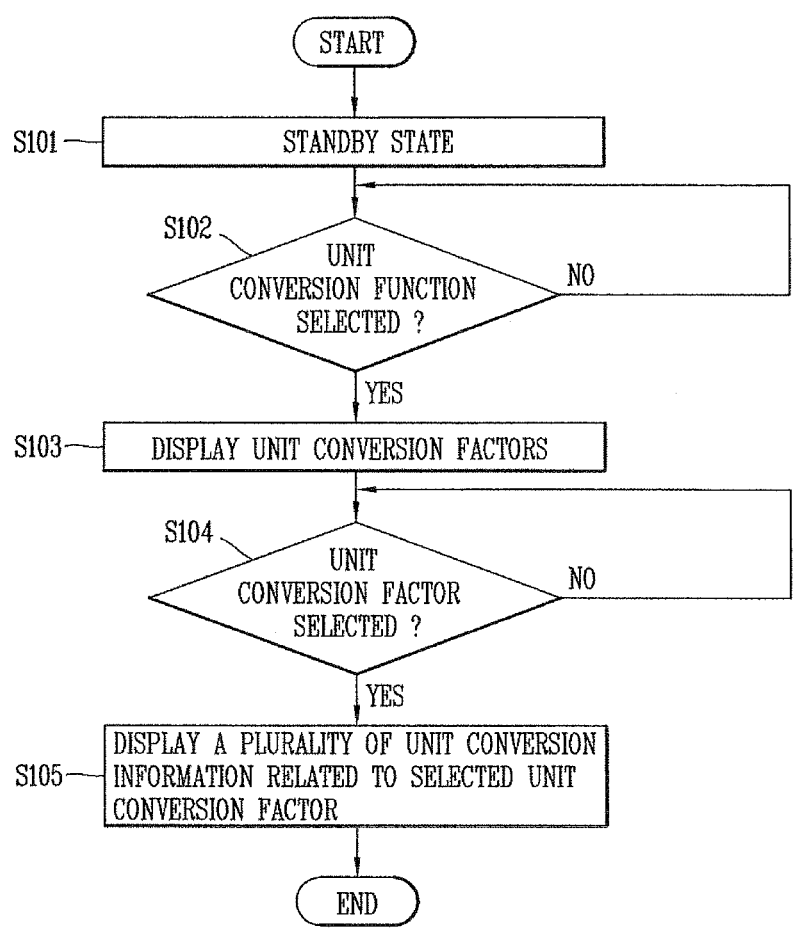
FIG. 5 is a flow chart illustrating a unit conversion method of a mobile terminal according to one embodiment of the present invention.

FIG. 5 is a flow chart illustrating a unit conversion method of a mobile terminal according to one embodiment of the present invention.

With reference to FIG. 5, the controller of the mobile terminal 100 in a standby state checks whether there is a unit conversion request (S101, S102). If there is a unit conversion request, the controller 180 displays unit conversion factors on the display unit 151 (S103). The unit conversion factors may include a currency, area, distance, weight, temperature, volume, speed, pressure, dimension (clothes dimension, footwear dimension, and the like), mass, power, bits and bytes, and the like. For example, when the user selects a unit conversion menu by manipulating the user input unit 130, the controller 180 executes a unit converter according to input data transferred from the user input unit 130.

When one or more of the unit conversion factors displayed on the display unit 151 is selected, the controller 180 displays one or more unit conversion information (S104, S105). The reference unit may be a unit set as default or a unit set by a user. The reference unit may be a unit used in a country in which the terminal is located.

For example, when the currency is selected from among the unit conversion factors and if the country in which the terminal is currently located is Korea, the controller 180 displays information converted into US dollar ($), Japanese Yen, Chinese yuan, Hongkong dollar, and the like, based on won, the reference unit related to the currency.

Figure 6:
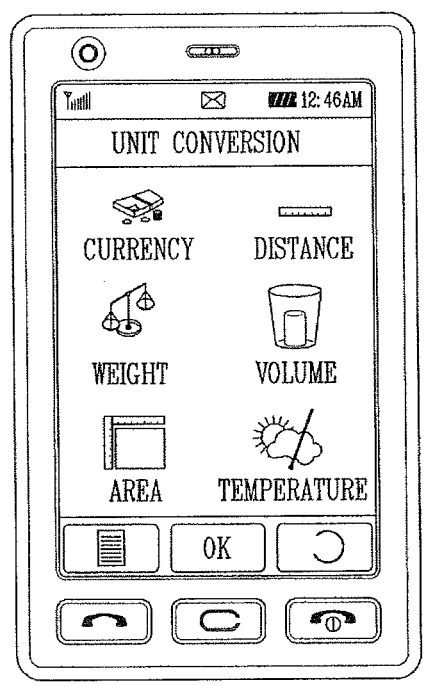
FIG. 6 is an overview of a display screen illustrating an executed unit conversion function of the mobile terminal according to an embodiment of the present invention.

FIG. 6 is an overview of a display screen illustrating an executed unit conversion function of the mobile terminal according to an embodiment of the present invention.

With reference to FIG. 6, when the user selects a unit conversion menu through menu manipulation, the controller executes the unit converter according to a user input. The controller 180 displays an executed screen of the unit converter on the display unit 151. Namely, the controller displays aligned unit conversion factors. When one of the displayed unit conversion factors is selected, the controller 180 displays unit conversion information with respect to the selected factor on the display screen.

Figure 7A:
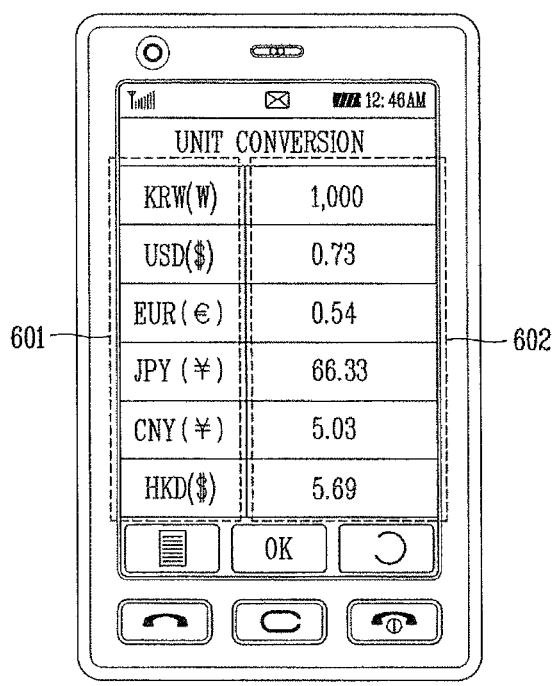
FIGS. 7A and 7B are overviews of display screens illustrating displaying of unit conversion information of the mobile terminal according to an embodiment of the present invention.
Figure 7B:
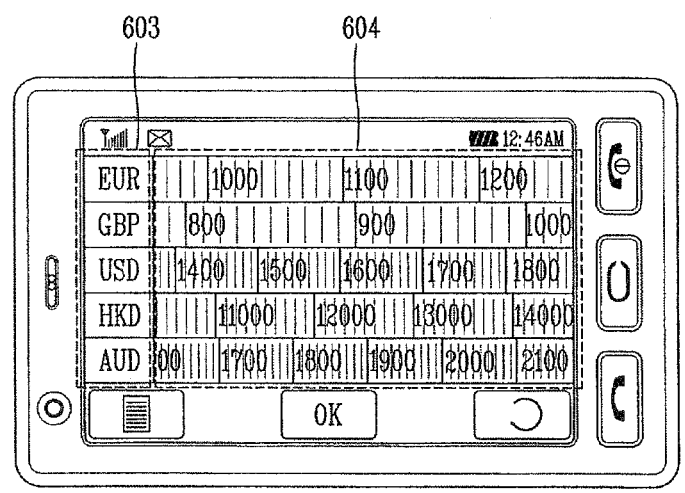

FIGS. 7A and 7B are overviews of display screens illustrating displaying of unit conversion information of the mobile terminal according to an embodiment of the present invention.

With reference to FIG. 7A, the controller displays unit types 601 of two or more units, and also displays number input/output windows 602 of each unit type. When a number is inputted to one of the number input/output windows 602, the controller 180 determines a unit corresponding to the number input/output window to which the number has been inputted, as a reference unit. And then, the controller 180 converts the other remaining units according to each corresponding ratio based on the number which has been inputted to the number input/output window of the determined reference unit, and outputs the same to the number input/output windows of the corresponding unit types.

With reference to FIG. 7B, when the unit conversion factor is selected, the controller displays unit scales 604 with respect to two or more unit types 603. The controller 180 displays different unit types and unit scale information of the types by rows. When a reference unit type is determined, the controller 180 re-aligns (re-organizes, re-arranges) and displays scale information of the other remaining unit items based on the selected unit type and scale information of the corresponding unit. When a reference unit is set, the controller 180 changes unit information color or display position of the reference unit for user recognition.

Figure 8:
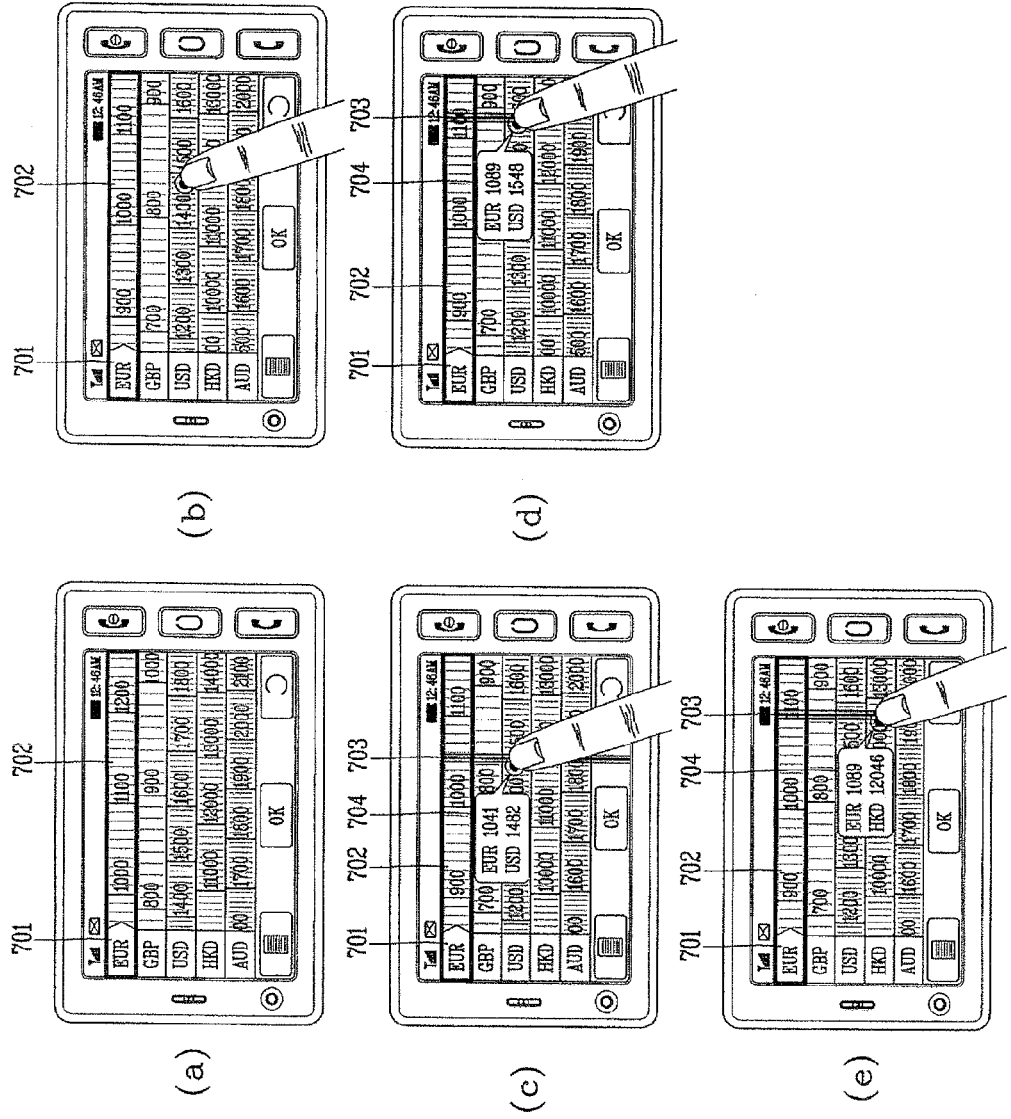
FIG. 8 is an overview of display screens illustrating comparing of units in the mobile terminal according to the embodiment related to FIG. 5.

FIG. 8 is an overview of display screens illustrating comparing of units in the mobile terminal according to the embodiment related to FIG. 5.

With reference to FIG. 8, when the user selects the unit converter according to a certain procedure, the controller 180 executes the unit converter and displays unit conversion-available factors. When 'currency' among the displayed factors is selected, the controller 180 displays two or more unit conversion information related to currency (a). The unit conversion information includes a unit type 701 and a unit scale 702. The controller aligns the unit scale 702 with reference to a pre-set reference unit and displays the same. For example, if euro, a European currency, is a reference unit, the controller 180 displays the corresponding unit information in a first row and then aligns and displays scale information of the other remaining units based on the reference unit and exchange rate information. Here, as the exchange rate information, a pre-set value in the memory 160 or a value directly inputted by the user may be used, and in addition, real time exchange rate information may be acquired through the wireless communication unit 110 and used.

When a touch input is generated at a region where the unit scale 702 is displayed, the controller 180 detects the touch input via the sensing unit 140 and performs a corresponding operation according to the detected touch input. For example, when a landscape flicking or drag & drop is detected at the region where the unit scale is displayed, the controller may scroll horizontally the overall unit scale.

After a long touch to one point at the region where the unit scale 702 is displayed is detected, the controller 180 displays a reference line 703 and detailed information of the corresponding point in a balloon form 704 (b-c). The detailed information includes the reference unit and scale information of the unit of the long touch point.

When a pointer is moved with the touch maintained, the controller 180 moves the reference line 703 according to the movement of the pointer and displays scale information 704 of the moved point in the balloon form on the display unit 151.

For example, when the pointer is moved horizontally with the touch state maintained, the controller moves the reference line 703 to the point to which the pointer has been moved and displays scale information 704 of the corresponding point (d).

Meanwhile, when the pointer is moved vertically with the touch maintained, the controller 180 displays scale information 704 of the moved touch point in a state that the reference line 703 is maintained as it is (e).

Figure 9:
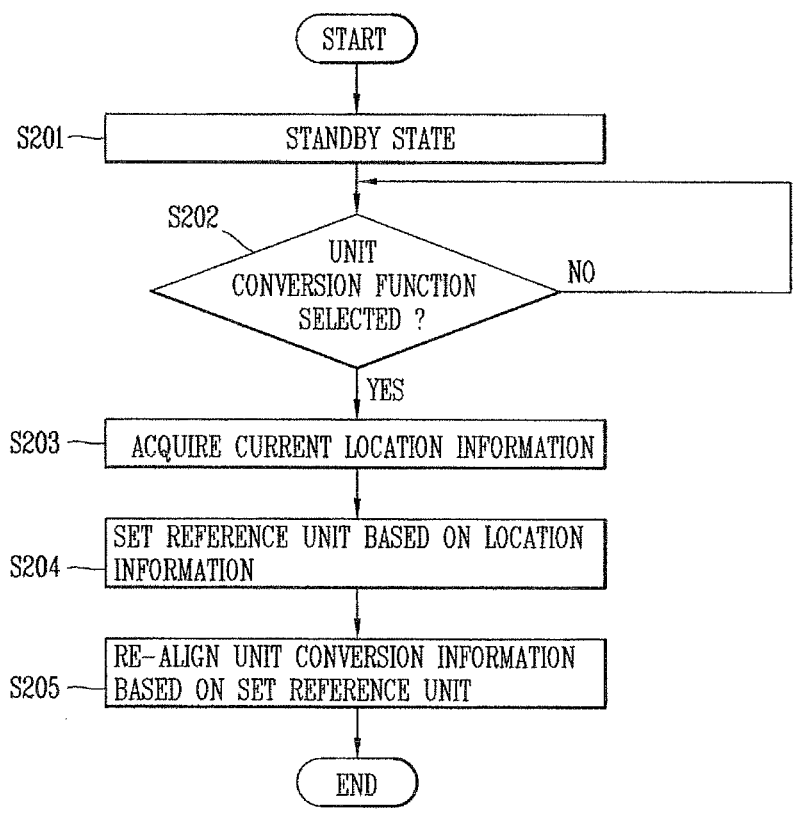
FIG. 9 is a flow chart illustrating a unit conversion method of the mobile terminal according to another embodiment of the present invention.

FIG. 9 is a flow chart illustrating a unit conversion method of the mobile terminal according to another embodiment of the present invention.

First, when the unit conversion function is selected through menu manipulation by the user, the controller 180 of the mobile terminal 100 in a standby state executes the corresponding function (S201, S202). Namely, when the user selects the unit converter from the menu by manipulating the user input unit 130, the controller 180 executes the unit converter according to the user input.

When the unit conversion function is executed, the controller 180 acquires current location information via the location information module 115 (S203). The controller 180 may check the current location with reference to roaming information stored in the terminal. In addition, the controller 180 may acquire the location information via the mobile communication module 112.

When the information about the current location of the mobile terminal 100 is acquired, the controller 180 determines a reference unit based on the acquired location information (S204). Namely, the controller 180 sets a unit used in the area where the terminal is currently located, as a reference unit. For example, if the mobile terminal 100 is located in the United States, the controller sets a reference unit of currency as dollar ($) and sets a reference unit of speed as mile.

With the reference unit determined, the controller 180 re-aligns unit conversion information according to the determined reference unit (S205). With the reference unit determined, the controller 180 displays information converted into one or more different units based on the reference unit on the display unit 151. The conversion information may be displayed in the form of a unit scale or in a text form.

FIG. 10 is an overview of display screens illustrating unit conversion in the mobile terminal related to the embodiment of FIG. 9.

First, when the mobile terminal 100 moves from a currently located area to a different area, the controller 180 of the mobile terminal 100 performs roaming operation to connect to a network of the visiting area. For example, if the mobile terminal 100 moves from Korea to the United States, the controller 180 of the mobile terminal 100 controls the wireless communication unit 110 to attempt connection to the network of the United States, the visiting area, to roam to the network of the visiting area.

Thereafter, when the unit conversion function is selected through menu manipulation by the user, the controller 180 aligns the unit conversion factors as shown in FIG. 10(a) and displays the same on the display unit 151. Namely, the controller 180 displays the factors available for unit conversion, for example, the currency, distance, weight, volume, speed, area, temperature, dimension, and the like.

When one of the unit conversion factors displayed on the display screen is selected, the controller drives the wireless communication unit 110 to acquire current location information. In this case, the controller 180 may display a message informing that terminal location information is being acquired, in a pop-up form on the display screen (b). Namely, the controller 180 displays a notification message such as 'location information is being acquired' on the display screen. In this embodiment, the case where the notification message is displayed on the display screen is taken as an example, but the design can be changed to be implemented in a different form that can be recognized by the user such as an effect sound, vibration and the like.

The controller 180 may drive the location information module 115 to acquire the current location information of the terminal from satellites, or may acquire the current location information from a base station via the mobile communication module 112.

When the current location information of the terminal is acquired, the controller 180 sets a reference unit based on the location information, aligns information converted into one or more different units based on the set reference unit, and displays the same on the display screen (c). For example, with the mobile terminal 100 located in the United States, if the 'distance' is selected as the unit conversion factor, the controller 180 sets feet as a reference unit and displays one or more unit calculation information aligned based on the reference unit. As shown in the drawing, scale information of each unit converted into distance units such as meter, inch, yard, mile is aligned based on the feet and displayed.

Figure 11:
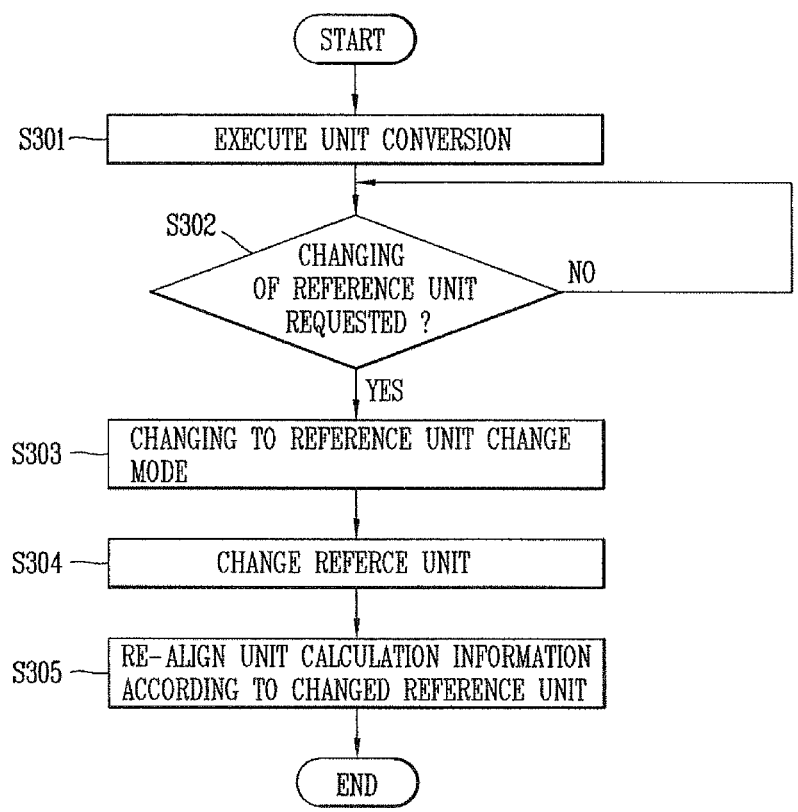
FIG. 11 is a flow chart illustrating a unit conversion method of the mobile terminal according to still another embodiment of the present invention.

FIG. 11 is a flow chart illustrating a unit conversion method of the mobile terminal according to still another embodiment of the present invention. In this embodiment, the case where a reference unit is changed while the unit conversion function is being executed is taken as an example.

With reference to FIG. 11, if a reference unit is requested to be changed while the unit conversion function is being executed, the controller 180 changes the execution screen into a reference unit changing mode (S301, S302). For example, if a long touch applied to the region where the reference unit type is displayed among the unit conversion information displayed on the display screen is detected, the controller 180 recognizes it as a request for changing the reference unit and changes the screen into the reference unit changing mode.

In the reference unit changing mode, when a unit to be changed is selected, the controller 180 sets the selected unit as a reference unit (S303, S304). In the reference unit changing mode, the controller 180 displays a changeable unit type list.

When the reference unit is completely changed, the controller 180 re-aligns unit calculation information based on the changed reference unit (S305). When one of unit types on the displayed list is selected, the controller sets the selected unit type as a reference unit. The controller 180 converts one or more units based on the set unit type based on the set unit type and displays the corresponding information on the display unit.

FIG. 12 is an overview of display screens illustrating changing of reference units in the mobile terminal according to an embodiment of the present invention.

As shown in FIG. 12, if a touch applied to a region where the reference unit conversion information is displayed is detected, the controller 180 detects the touch via the sensing unit 140 and recognizes the detected touch input as a request for changing the reference unit (a). For example, if a long touch applied to the region where the unit type of the reference unit is displayed is detected, the controller 180 recognizes the detected long touch as a reference unit changing request.

When changing of the reference unit is requested, the controller changes the execution screen into a mode allowing changing of the reference unit. As shown in (b), one or more unit types is arranged and displayed at a region where the reference unit information is displayed.

When one of the displayed unit types is selected, the controller 180, the controller 180 displays the unit conversion information re-aligned based on the selected unit (c). Namely, when one of the unit types on the list displayed on the display screen is selected, the controller 180 converts the other remaining units based on the selected unit type as a reference unit and displays the re-aligned converted information.

FIG. 13 is an overview of display screens illustrating a unit changing method of the mobile terminal according to an embodiment of the present invention.

When the unit conversion menu is selected in a standby state through menu manipulation, the controller executes the selected unit conversion menu. Namely, the controller 180 executes a unit conversion application program.

When the unit conversion menu is executed, the controller 180 displays the execution screen on the display screen. For example, as shown in FIG. 6, the controller 180 arranges and displays the unit conversion factors on the display unit 151. When one of the displayed factors is selected, the controller 180 displays an execution screen for performing unit conversion related to the selected factor. For example, if a country unit comparison is selected from among the unit conversion factors, the controller 180 displays a select screen allowing selection of a country for unit comparison (a). When two or more countries is selected on the select screen, the controller 180 displays unit information of each factor used in the corresponding countries.

For example, if Korea and the United States are selected, the controller 180 displays unit conversion information related to the factors such as currency, distance, weight, mass, speed, and the like, used in Korea and the United States. When a number is inputted to a number input window of the factor desired for unit conversion on the screen displaying the unit conversion information, the inputted number is converted into a different unit and outputted. For example, if US$1 is inputted to the number input/output window corresponding to the currency factor, the controller 180 converts US$1 into won currency and outputs it to won currency input/output window.

As so far described, the mobile terminal according to at least one embodiment of the present invention can convert one unit into a plurality of units and display the converted information.

In addition, the plurality of unit conversion information can be displayed as scale information, so that the plurality of unit conversion information can be compared immediately.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

In the embodiments of the present invention, the above-described method can be implemented as software codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). The computer may include the controller 180 of the terminal.

The mobile terminal according to the embodiments of the present invention is not limited in its application of the configurations and methods, but the entirety or a portion of the embodiments can be selectively combined to be configured into various modifications.

What is claimed is:

1. A mobile terminal comprising:
   a display;
   a user input unit; and
   a controller configured to:
   display on the display a list of unit of measurement when a unit conversion function is executed, wherein each unit of measurement on the list is a unique unit of a same measurement type,
   display on the display a screen that includes a scale in a reference unit of measurement and scales in at least two other units of measurement when one of the unit of measurement on the displayed list is selected as the reference unit of measurement, wherein the scales in the at least two other units of measurement include a first scale in a first unit of measurement and a second scale in a second unit of measurement,
   generate a first value in the first unit of measurement corresponding to a location of a touch input applied via the input unit on the first scale in the first unit of measurement and generate a reference value in the reference unit of measurement corresponding to the first value, and
   simultaneously display on the display the reference value and the first value while the touch input is maintained on the location.

2. The mobile terminal of claim 1, wherein the same measurement type is currency, distance, weight, volume, area, temperature, pressure, or sizes of footwear and clothes.

3. The mobile terminal of claim 1, wherein the reference unit of measurement is automatically set by determining a current location of the mobile terminal using a GPS module of the mobile terminal and by selecting a unit of measurement that corresponds to the current location.

4. The mobile terminal of claim 1, wherein the reference scale in the reference unit of measurement is displayed on a first row of the screen, and the first scale in the first unit of measurement and the second scale in the second unit of measurement are displayed on respective rows of the screen below the first row.

5. The mobile terminal of claim 4, wherein a vertical reference line crossing the location of the touch input and the reference scale on the first row is displayed in response to the touch input applied on the location.

6. The mobile terminal of claim 5, wherein a second value in the first unit of measurement unit is generated when the touch input is dragged to another location on the first scale in the first unit of measurement, and the reference value is updated to correspond to the second value in the first unit of measurement.

7. The mobile terminal of claim 1, wherein the reference value and the first value are displayed in a balloon form.

8. A unit conversion method of a mobile terminal, the method comprising:
   displaying a list of unit of measurement when a unit conversion function is executed, wherein each unit of measurement on the list is a unique unit of a same measurement type;
   displaying a screen that includes a scale in a reference unit of measurement and scales in at least two other units of measurement when one unit of measurement on the displayed list is selected as the reference unit of measurement, wherein the scales in the at least two other units of measurement include a first scale in a first unit of measurement and a second scale in a second unit of measurement;
   generating a first value in the first unit of measurement corresponding to a location of a touch input applied on the first scale in the first unit of measurement and generate a reference value in the reference unit of measurement corresponding to the first value; and
   simultaneously displaying the reference value and the first value while the touch input is maintained on the location.

9. The method of claim 8, wherein the reference unit of measurement is automatically set by determining a current location of the mobile terminal using a GPS module of the mobile terminal and by selecting a unit of measurement that corresponds to the current location.

10. The method of claim 8, wherein the displaying the screen includes
    displaying the reference scale in the reference unit of measurement on a first row of the screen; and
    displaying the first scale in the first unit of measurement and the second scale in the second unit of measurement on respective rows of the screen below the first row.

11. The method of claim 10, wherein the displaying the reference value and the first value includes displaying a vertical reference line crossing the location of the touch input and the reference scale on the first row.

12. The method of claim 11, further including
    generating a second value in the first unit of measurement unit when the touch input is dragged to another location on the first scale in the first unit of measurement; and
    updating the reference valued to correspond the second value in the first unit of measurement.

13. The method of claim 8, wherein the reference value and the first value are displayed in a balloon form.

* * * * *